T. PRITCHARD.
Devices for Connecting Car-Axles with Axle-Boxes.
No. 140,303. Patented June 24, 1873.

Witnesses
Thomas J. Bewley.
William P. Wright

Inventor
Thomas Pritchard
By His Attorney
Stephen Ustick

UNITED STATES PATENT OFFICE.

THOMAS PRITCHARD, OF PHILADELPHIA, PENNSYLVANIA, ASSIGNOR OF TWO-THIRDS HIS RIGHT TO JOHN LOUGHLIN AND CHARLES DARRAGH, OF SAME PLACE.

IMPROVEMENT IN DEVICES FOR CONNECTING CAR-AXLES WITH AXLE-BOXES.

Specification forming part of Letters Patent No. 140,303, dated June 24, 1873; application filed May 16, 1873.

*To all whom it may concern:*

Be it known that I, THOMAS PRITCHARD, of the city of Philadelphia and State of Pennsylvania, have invented an Improvement in the Connection of Car-Axles with their Boxes, of which the following is a specification:

My invention consists in the combination of screw-bolts or shafts with the journal-boxes and with attachable conical bearings in the outer faces of the hubs of the wheels, the bearings being lubricated direct from the boxes through the center bores of the bolts, as hereinafter fully described.

Figure 1:
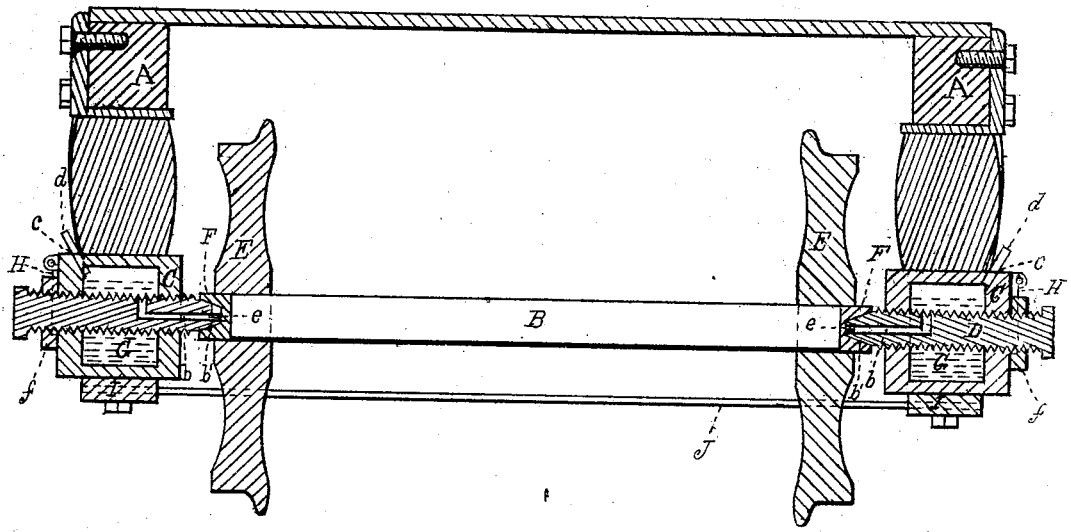
Figure 2:
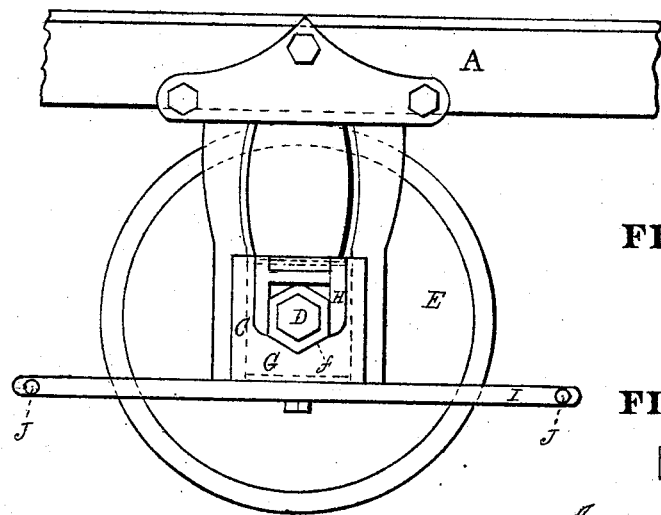
Figure 3:
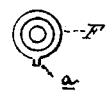
Figure 4:
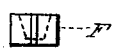

Figure 1 is a vertical section of the truck-frame A, axle B, and parts in connection herewith. Fig. 2 is a side elevation of a portion of the truck-frame and parts attached. Figs. 3 and 4 are a side and edge views of one of the steel bearings F.

Like letters in all the figures indicate the same parts.

A is the truck-frame having pedestals provided with boxes C C. B is an axle having wheels E. The axle instead of having journals is connected with the boxes C C by means of the screw-bolts D D, which fit in threads cut in the front and rear sides of the boxes. The ends of the bolts are conical, as represented, and fit in steel bearings F sunk in the sides of wheels centrally therewith. The bearings have a spline, $a$, as seen in Figs. 3 and 4, which prevents their turning around. The bolts D D are made of hardened steel. They have a central bore, $b$, which leads from its conical end and has an outward extension, $b'$, as seen in Fig. 1, so as to open communication with the oil-chambers G of the boxes C C. The oil being kept in the closed boxes is kept perfectly clean, there being no opening through which dust can pass, as in the usual mode of connecting the journals of the shafts with bearing in the inside of the boxes. The only openings in the boxes are those occupied by the bolts D and the opening C in the top, for the filling of the boxes with oil, closed by means of the plug $d$. The conical ends of the bolts have a short slit, $e$, at one side to admit of a free passage of the oil to the bearing from the central bore $b$. The bolts are provided with jam-nuts $f$, which are prevented turning by means of the hinged lock-plate H, as seen clearly in Fig. 2.

The steps F may be dispensed with by forming the bearings in the ends of the axle D. Yet the use of steel-bearings is preferable.

The pedestals are prevented spreading apart by means of the longitudinal bars I I and stay-rods J J.

I claim as my invention—

1. In combination with the journal-boxes of railroad cars and the hubs of the wheels, the adjustable screw-bolts D, and conical bearings F, substantially as and for the purpose set forth.

2. The bolts D having the central bore $b$ and an outward extension, $b'$, in combination with the oil-chamber G and conical step F, substantially in the manner and for the purpose above described.

THOMAS PRITCHARD.

Witnesses:
STEPHEN USTICK,
THOMAS J. BEWLEY.